May 11, 1948. W. C. L. HAUBROE 2,441,147
SIGHTING DEVICE FOR AIR-TARGET GUNS
Filed Jan. 11, 1940 6 Sheets-Sheet 1

INVENTOR
WERNER CHRISTIAN LASSEN HAUBROE
BY
ATTORNEY.

May 11, 1948. W. C. L. HAUBROE 2,441,147
SIGHTING DEVICE FOR AIR-TARGET GUNS
Filed Jan. 11, 1940 6 Sheets-Sheet 6

Fig. 7.

INVENTOR:
WERNER CHRISTIAN LASSEN HAUBROE,
BY
ATTORNEY.

Patented May 11, 1948

2,441,147

UNITED STATES PATENT OFFICE 2,441,147

SIGHTING DEVICE FOR AIR-TARGET GUNS

Werner Christian Lassen Haubroe, Copenhagen, Denmark; vested in the Attorney General of the United States Application January 11, 1940, Serial No. 313,395
In Denmark August 1, 1939

5 Claims. (Cl. 33—49)

The present invention relates to a sighting device for air-target guns, and the distinguishing feature of the device according to the invention is that the objective used is a rectilinear thread (the sight thread) with a marked central point and two point marks adapted to slide along the thread, symmetrically in opposite directions, towards and away from the central point. The said thread is stretched in a frame suspended in gimbals from posts on a frame which is pivoted about a horizontal and a vertical axis, while the eyepiece is a thin, preferably transparent, disc with a sight hole having a blackened edge. The disc is mounted on a post adapted to slide in the above mentioned frame, towards and away from the sight thread, as well as up and down. The sight hole is situated in a vertical plane passing through the central point of the thread and forming a certain small angle (the angle of rifling deviation) with the vertical plane through the bore axis of the gun for which the device forms a sighting apparatus. The gun and the frame of the apparatus are coupled together in such a manner that the gun and the apparatus frame normally perform the same angular motion about a horizontal axis and also the same angular motion about a vertical axis. The gun and the sight-thread frame are coupled together in such a manner that the last mentioned frame normally performs the same angular motion, but in the opposite direction, about its two gimbal axes as does the gun about its horizontal and vertical axis of rotation, or vice versa (i. e., that when the thread frame is rotated, then the gun will follow in the opposite direction). The gun and the sight-hole disc are coupled together in such a manner that the sight hole will be raised or lowered, when the elevation of the gun is decreased or increased, respectively, or vice versa (i. e., the angular motion of the gun about a horizontal axis is derived from the vertical motion of the sight hole).

By the following operations, (1) Adjusting the one point mark on the thread that is situated to the side of the central part thereof that faces towards the direction of motion of the target, at a distance from the central point of the thread corresponding, to a certain scale, to the velocity of the target, and (2) Adjusting the eyepiece with its sight hole at a distance from the thread centre corresponding, to the same scale, to the mean projectile velocity corresponding to the distance of the target, (3) Then with unaltered couplings moving the sight field towards the target, (4) Subsequently—by impressing on to the thread frame the requisite extra rotation about its gimbal axes, without at the same time imparting to the gun or the apparatus frame a corresponding rotation about a horizontal and vertical axis—bringing the sight thread into a position that is parallel to the target course and (5) Finally, with full coupling between the thread frame and the gun or the apparatus frame adjusting the final sight to the target, through the sight hole and above the above mentioned point mark that is situated to the side of the central point of the thread, during the further rotation of the gun or the apparatus frame, respectively, about a horizontal and vertical axis, in order to maintain the last mentioned sight, there will have been fixed three apexes (the movable point mark, the sight hole and the thread centre) of a triangle. This triangle is similar and similarly situated in one and the same plane and with the same apex as the triangle determined at any moment by the momentary position of the target, the position of the gun (the sighting device) and the point of the target course that would be hit, if the gun, properly directed, were fired at the moment concerned. Consequently, if the position of the gun, relatively to the thus fixed triangle, is "correct direction" for the gun at one moment, there will be full hitting probability for a shot fired at any moment, as long as the sight is maintained.

The sighting device may be mounted on the gun itself and then preferably in duplicate, one for the "lateral adjuster" which operates the side-turning apparatus of the gun, and one for the "elevation-adjuster" which operates the elevating apparatus of the gun. The device may also be mounted some distance away from the gun, and it serves then as a common sighting device for several guns forming a battery.

The principal idea underlying the invention and one embodiment of the same, in the above mentioned duplex construction, are illustrated in the drawings.

Figs. 3 to 7 show the sighting device, in duplicated form, mounted on a gun, viz., Fig. 3 the gun with the sighting device, in plan view, Fig. 3a a vertical section on the line IIIa—IIIa in Fig. 3, Fig. 4 the same, in side elevation, viewed from the left, Fig. 5 a vertical cross-section of the right-hand sighting device, along the line V—V in Fig. 3, Fig. 6 another vertical cross-section of the same, along the line VI—VI in Fig. 3, and Fig. 7 a vertical longitudinal section of the same along the line VII—VII in Figs. 3, 5 and 6.

Figure 1:
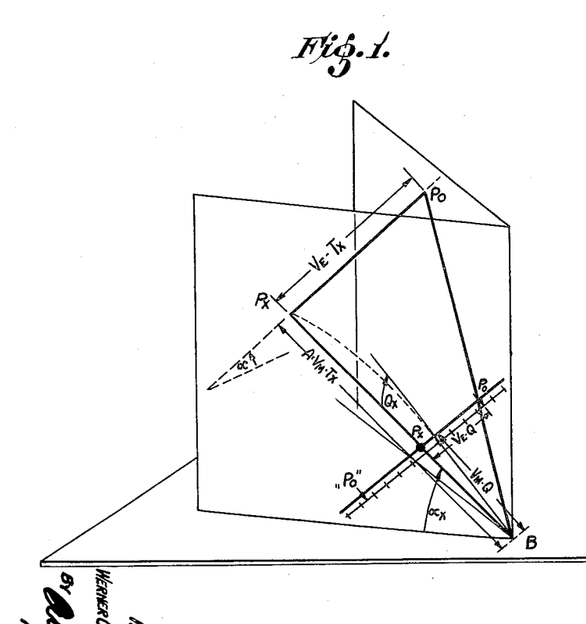
Fig. 1 illustrates the theoretical principle underlying the invention.

In Fig. 1, $P_0$ indicates the momentary position of an air target (for instance a flying machine) moving at a velocity $V_E$ in a path $P_0$—$P_x$ which forms an angle $d$ (the diving or, maybe, ascending angle) with the horizontal plane, and against which target a shot is fired at the moment concerned, from a gun situated at the point B which also indicates the sight hole in the eyepiece of the sighting device of the gun, in such a manner that the line B—$P_0$ indicates the sighting line to the target, at the moment of firing.

Assuming the projectile to hit the target at the point $P_x$, after a flying time $T_x$, the distance $P_0$—$P_x$ will be equal to $V_E \cdot T_x$; B—$P_x$ is the hitting-point chord of the projectile path, which chord forms an angle $\alpha_x$ (the angle of elevation of the hitting point) with the horizontal plane, and the angle $\phi_x$ (the excess elevation of the gun above the direction to the hitting point) with the tangent to the projectile path at the initial point of the latter, i. e., with the bare axis of the gun, at the moment of firing. The length of this chord B—$P_x$ or the distance A to the hitting point (the firing distance) is equal to $V_M \cdot T_x$, when $V_M$ indicates the mean velocity of the projectile, in the direction of the chord.

The angle $P_xBP_0$, is the prediction, i. e., the angle to be determined by means of the sighting device, before the shot is fired.

In the plane $P_x.B.P_0$ a line "$p_0$,"—$p_x$—$p_0$ (representing the objective thread of the sighting apparatus) is drawn parallel to the target course $P_0$,—$P_x$, and thus a triangle $p_xBp_0$ is formed having the same angles as, and the sides parallel to, those of the triangle $P_xBP_0$, and consequently we have: $p_x$—$p_0 = Q.V_E.T_x$ and B—$p_x = Q.V_M.T_x$ (Q being the ratio of similarity of the triangles) which shows that $p_x$—$p_0$ and B—$p_x$, respectively, are proportional to Q times the target velocity and Q times the mean projectile velocity which is smaller the greater the target distance is.

Figure 2:
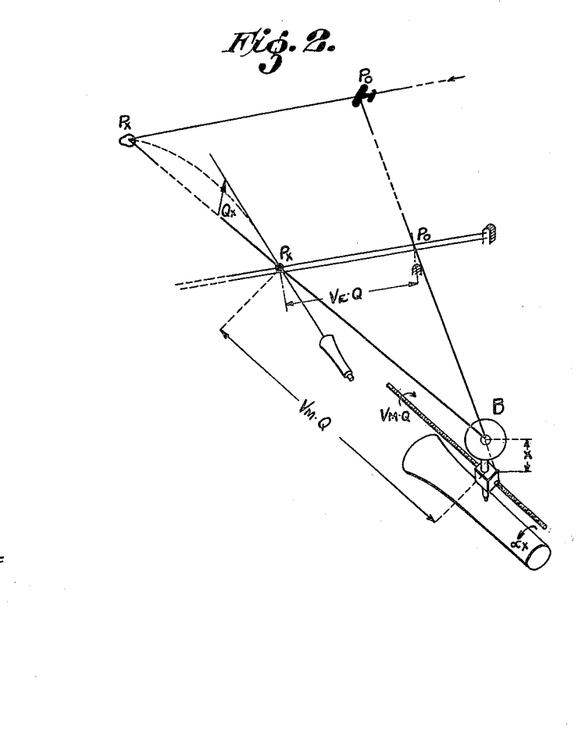
Fig. 2 is a diagrammatic representation of the sighting device according to the invention.

On the basis of what is pointed out above, the sighting device according to the invention is built up, see Fig. 2, by marking from a fixed point $p_x$, on a thread $p_x$—$p_0$ stretched as an objective in a sighting device (in practice preferably two parallel threads with a quite small mutual distance), a distance $p_x$—$p_0$, and in the direction towards the target, which distance is proportional to Q times the estimated mean velocity $V_E$, and by adjusting the thread parallel to the target course $P_0$—$P_x$ and subsequently, in vertical plane containing the point $p_x$ and being parallel to, or rather forming a certain small angle (the rifling deviation angle) with the vertical plane through the bore axis of the gun, moving an eyepiece sight hole B out to such a distance from the point $p_x$ that B—$p_x$ will be proportional, at the same rate Q to the mean projectile velocity corresponding to the estimated target distance (the distance to the target at the expected hitting point). By these means the apexes $p_0$,B and $p_x$ in a triangle $p_0Bp_x$ with the correct prediction angle $p_0Bp_x$ will be fixed. The thread is maintained parallel to the target course by means of a gimbal rotation of the thread about the point $p_x$ produced by, or accompanied by, a rotation of the gun about a horizontal and a vertical axis (i. e., about its trunnions and pivot) and with a simultaneous raising or lowering of the sight hole B, produced by the same just mentioned rotation about the horizontal axis, for the purpose of giving the bore axis of the gun, such an elevation $\phi_x$, above the line B—$p_x$ (i. e., above the direction to the target at the expected hitting point), as will correspond to the target distance and the angle of elevation of the target, in such a manner that the sight along B and $p_0$ will be directed towards the target. By these means the gun will be brought into such a position that a short fired at that moment will hit the point $P_x$, provided that the target velocity and the target distance have been estimated correctly, and provided that neither wind nor other circumstances (such as irregularities in the ammunition or variations of the air density from the standard) have influenced the projectile path, the two last mentioned circumstances, however, being generally negligible.

If the target velocity has been estimated correctly, but the target distance has been estimated either too long or too short (the mean projectile velocity too low or too high) and, consequently, the prediction angle determined by the sighting angle has become too large or too small, respectively, then the error will appear by a trial firing with tracer projectiles, since the tracer path will be situated above and in front of, or below and to the rear of, the target. The estimate is then corrected by moving the point B farther back from or, as the case may be, closer towards the point $p_x$.

If the target velocity is wrongly estimated, but the target distance (from which the mean projectile velocity is deduced) is estimated correctly, then the prediction angle $p_0Bp_x$ will also in this case be incorrect. The error which manifests itself, during the trial firing, in that the tracer path will come either in front of (if the estimated target velocity is too high) or behind the target (if the target velocity is estimated too low), could then be remedied by correcting the distance $p_x$—$p_0$. The error may also be corrected—and this is what is done by the sighting device according to the invention—by an adjustment of the distance B—$p_x$, i. e., the sight hole B is moved either away from or towards the point $p_x$, as the case may be, exactly as if instead thereof the target distance had been estimated too long or too short, respectively. In other words, the target velocity is always assumed to be estimated correctly, and the adjustment for target distance is corrected in all cases.

In an exactly corresponding manner, a correction is made for deviations due to wind—sidewind as well as fair wind or contrary wind. If in fact the target velocity, as well as the target distance, has been estimated correctly, but the wind causes the tracer path to come in front of the target (side wind from the side from which the target is coming) or above the target (fair wind), the effect will be the same as if the target velocity or the target distance, respectively, had been overestimated. According to the above explanation the remedy will be to correct the adjustment for target distance, in such a manner that the latter will correspond to a shorter target distance and, vice versa. If owing to the wind the tracer path comes to the rear of the target (side-wind against the direction of motion of the target) or below the target (contrary wind), the correction being then made for target distance, as if the latter had been estimated too short, so that consequently the adjustment for target distance has to be increased.

The major part of the correction to be given the gun in consequence of a given wind action is obviated, according to the sighting principle, in that the sighter maintains the body of the target along the sight thread. A wind at right angles to the direction of firing will cause the target motion to be accelerated or retarded, as the case may be. A wind with or against the direction of firing will cause the target to receive a deviation away from or towards the gun. These variations in the normal motion of the target are largely compensated by the modification received by the projectile path owing to the wind. Merely the less important remnant value has to be corrected for by the target distance used. In this manner the corrector corrects for the influence of wind, automatically and completely.

Owing to the circumstance that any requisite correction is always performed in one and the same manner (for instance by means of one and the same crank handle), the air-target sighting device according to the invention, in comparison with all air-target sighting devices known heretofore, is superior in respect to simplicity of operation and, considering the shortness of the period during which an air target can be fired at, this circumstance has a decisive influence on the probability of attaining a hit.

Figs. 3 to 7 show the air-target sighting device in two mutually synchronously coupled similar apparatuses disposed on either side of an air-target gun in a convenient position for sighting by the two "directors" of the gun, viz., the "side director" and the "elevation-director" who operate the devices for lateral and vertical adjustment of the gun, while following the target, maintaining the proper sight, with the line B—$p_0$ (see Figs. 1 and 2) directed towards the target and with the objective thread in line with the target course, while a third person—the gun commander or "fire leader"—observes the positions of the tracer paths, relatively to the target and, independently of the directors, gives the sighting devices the requisite corrections which the "directors" then transmit to the sight.

Figures 3, 3A:
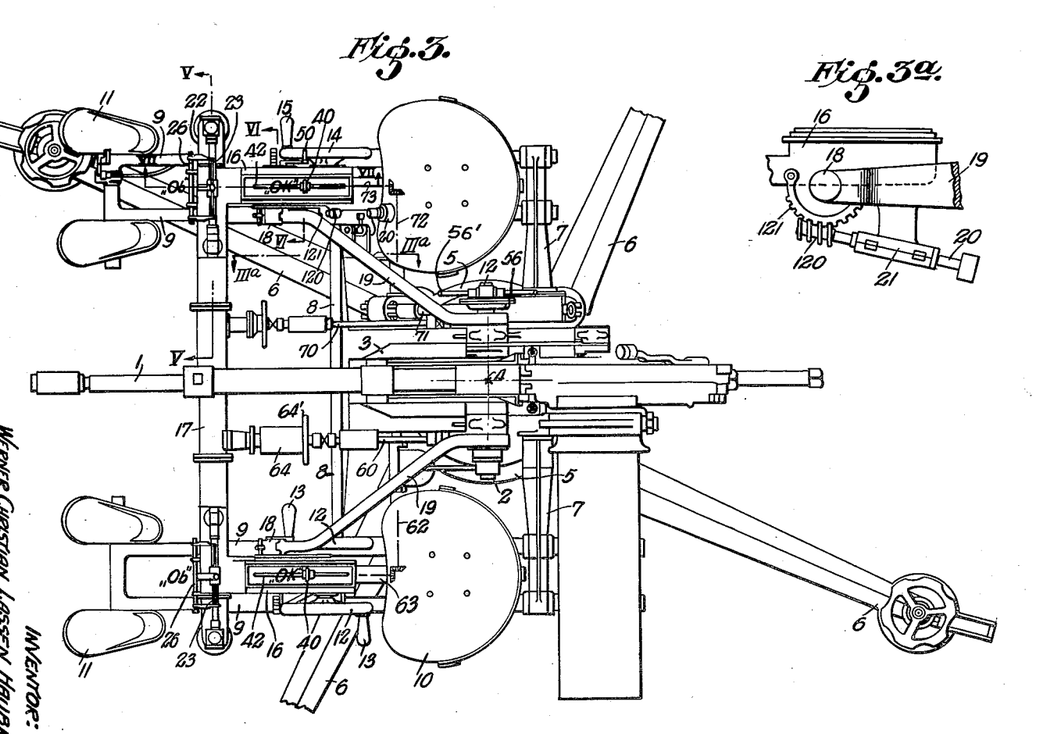
Figure 4:
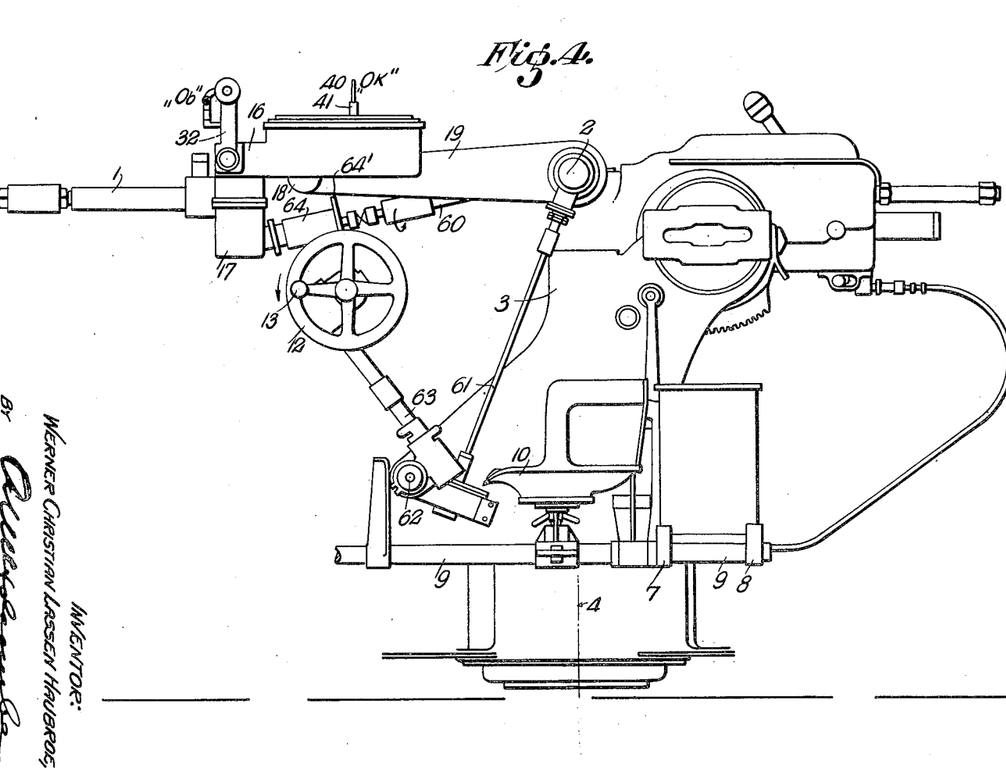
Figure 5:
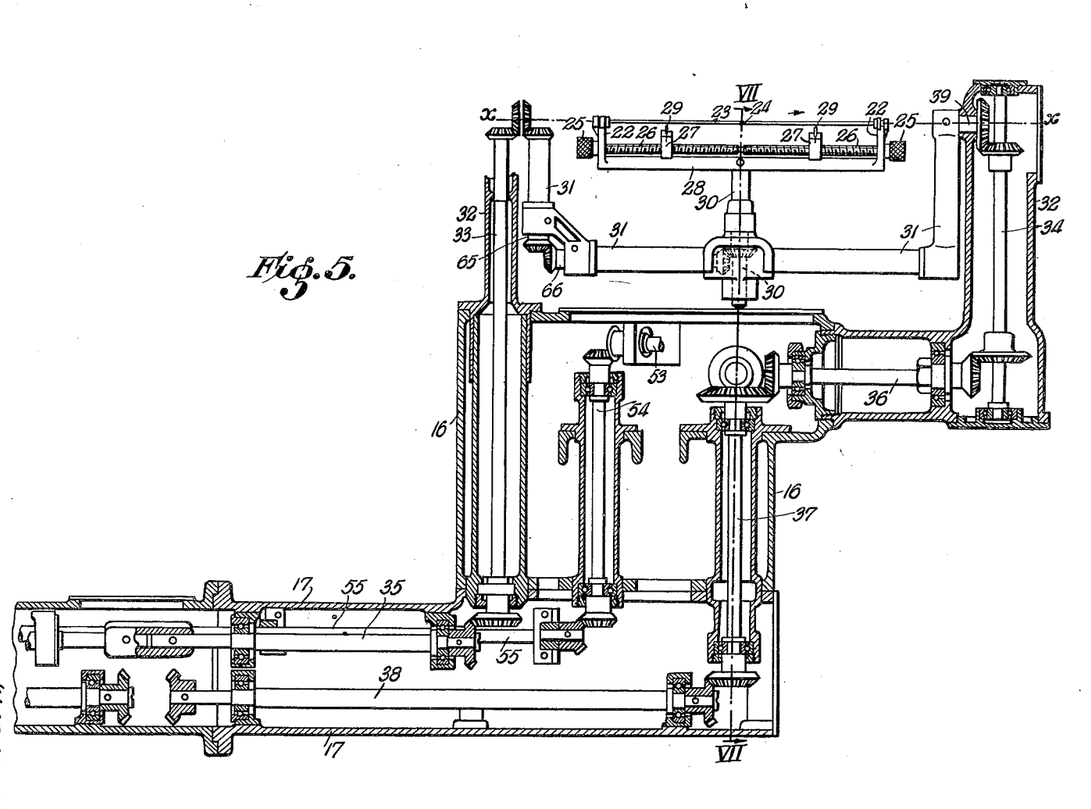
Figure 6:
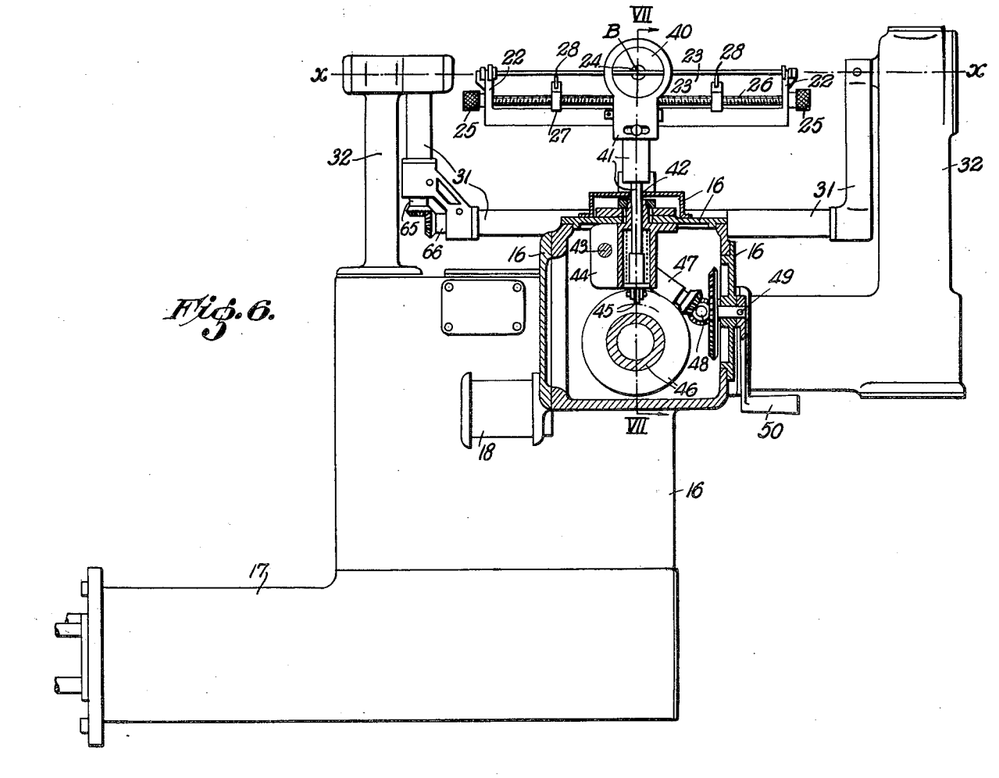
Figure 7:
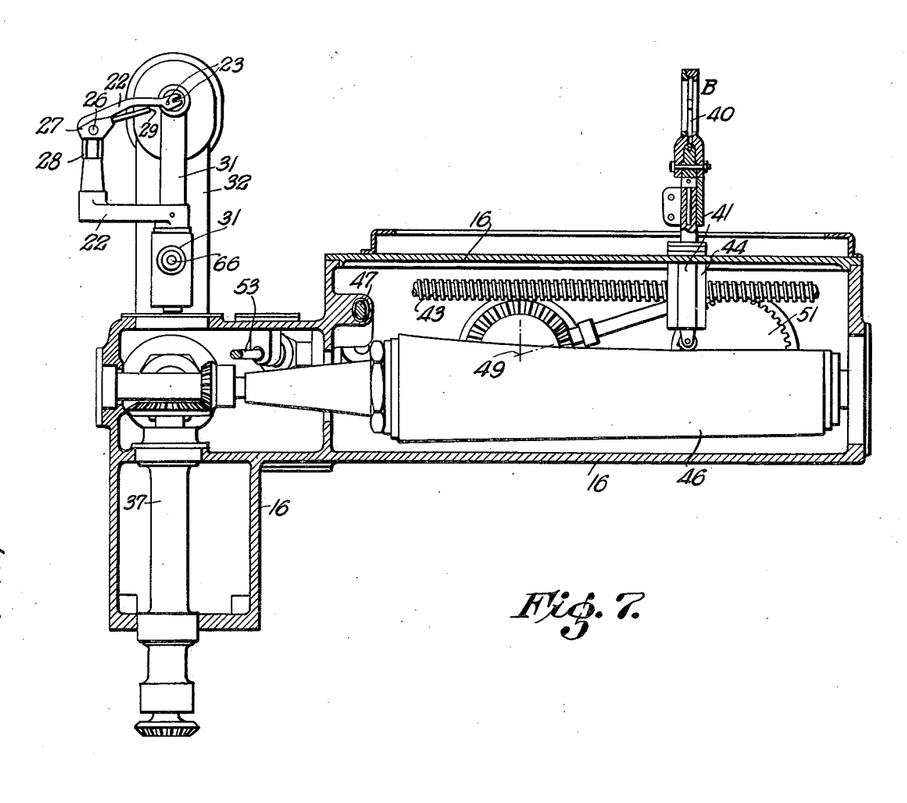

In Figs. 3 and 4, 1 is the gun, 2 its trunnions (horizontal axis of rotation), 3 the carriage of the gun and 4 the pivot pin of the same (the vertical axis of rotation of the gun) which is situated centrally below the trunnion axis, and in Fig. 3 is merely marked by a cross and in Fig. 4 by a line. 5 is the support which rests on the ground (the footing) with four legs 6. (The support and its legs are not shown in Fig. 4.)

The carriage has on either side of the gun a couple of heavy arms 7 and 8, each pair of arms carrying, on beams 9, a seat 10 and footrests 11 for one of the two "directors," viz., the "side-director" to the left and the "elevation-director" to the right of the gun. The beams 9 support further the devices for lateral and vertical adjustment of the gun, indicated in the figure by means of hand-wheels with crank handles, 12, 13 and 14, 15, respectively, disposed conveniently for being operated by the "director" concerned.

Each of the two sighting devices consists, as mentioned above, of an objective set marked "Ob" and an eyepiece set marked "Ok," both of which are mounted in and on a frame 16. The two frames 16 are firmly interconnected by a hollow transverse beam 17 parallel to the trunnion axis of the gun, and by means of pins 18 which are situated in line with each other and are parallel to the trunnion axis of the gun the two frames are suspended together in arms 19 attached to the trunnions of the gun, in such a manner that the entire duplex sighting device is elevated and lowered and turned sideways together with the gun, and further may be rotated within narrow limits about its pins 18 by means of an adjusting screw 20 (see Fig. 3a) the spindle of which is journaled in such a manner that it is free to rotate but not to slide in a bracket 21 on one of the arms 19 and, by means of a worm gear 120 engages a helically toothed sector 121 which is attached to the adjacent frame 16.

According to the above description, the objective set "Ob" (Figs. 3 and 4) consists of a thread 23 (in practice two parallel fine piano wires situated at a short distance from each other and both marked 23) stretched in a frame 22 (Figs. 5 and 6) the central point 24 of which (the above mentioned point $p_x$, see Figs. 1 and 2) is marked for instance with a small ball 24, and which is free to turn in gimbals about its said central point. Parallel to the thread 23 there is journalled in the frame 22 a spindle 26 which has knurled end knobs 25, and the two halves of which are threaded with the same pitch but in opposite directions, and each carries a nut 27 (see Fig. 7) which by means of a guide rail 28 parallel to the spindle is prevented from rotating, for which reason the two nuts, when the spindle is rotated, will move symmetrically in opposite directions, away from or towards the centre of the spindle. The two nuts 27 are each fitted with a needle 29 which needles, during the travel of the nuts, will move along the thread 23 and, together with the latter will indicate the above mentioned point marked "$p_0$" and "$p_x$" on the thread. During the use of the sighting device, the needles (the point-markers) are to be adjusted in such a manner that their distance from the central point of thread will correspond to the estimated target velocity. For this purpose the guide rail 28 is fitted with a $V_E$-scale indicating for instance m./sec. (metres per second) on one side of the centre and km./hour (kilometres per hour) on the other side.

In order to procure the universal mobility of the thread about its central point, the frame 22 (the inner gimbal frame) is fitted with a pin 30 which is perpendicular to the longitudinal direction of the thread, and the axis of which passes through the central point of the thread, and which is pivoted in another frame 31 (the outer gimbal frame) which in its turn is suspended at the top of two posts 32 extending from the frame 16, and is pivoted about an axis X—X passing through the central point of the thread and being perpendicular to the pin 30.

The rotation of the gimbal frames is effected by shafts 33 and 34 journalled in the frame 16 and the said posts 32, one of the said shafts 33, being driven from the lateral turning device of the gun, by means of suitable intermediate shafts—including a shaft 35 which is journalled in the transverse beam 17, and (by means of shafts 60, 61, 62, 63, see Figs. 3 and 4) is coupled by way of the trunnion axis of the gun to the lateral turning apparatus, and which also drives the corresponding post shaft of the other sighting apparatus—and transmits its motion by way of shafts 65 and 66 journalled in hollow frame members of the outer gimbal frame, to the pin 30 of the inner gimbal frame, while the other post shaft 34 is driven from the elevating apparatus of the gun, by means of suitable intermediate shafts—including shafts 36 and 37 in the frame 16 and a shaft 38 which is journalled in the transverse beam 17 and (by means of shafts 70, 71, 72, 73) is coupled, by way of the trunnion axis of the gun, to the gun-elevating apparatus, and which also drives the post shaft corresponding to the other sighting-device—and transmits its motion to the pin 39 by means of which the outer gimbal frame is suspended at the top of the post concerned.

When the gun, by means of the elevating and laterally turning apparatuses, has been brought into such a position that the "directors" have the target in the field of sight, then the laterally turning apparatus is uncoupled temporarily from the inner gimbal frame, while the sight thread is caused to become parallel to the target course. This uncoupling is effected by the "side-director" by means of a wheel-operated friction coupling 64 on the shaft 60 that drives the shaft 35 which coupling is arranged in such a manner that any rotation of the wheel 64' causes the uncoupling of the rearmost portion of the shaft 60 and, simultaneously, the coupling of the wheel to the foremost portion of the shaft, in such a manner that the rotation of the wheel is transmitted to the inner gimbal frame. The further rotation of the outer gimbal frame required for adjusting the sight thread is effected simultaneously by the "elevation director" by means of the elevating apparatus of the gun. When the thread is adjusted, the friction-coupling wheel 64' is released, after which the proper position of the sight thread is subsequently maintained by means of the elevating and side-turning apparatuses.

The eyepiece set "Ok" (Fig. 3) consists, as mentioned above, of a thin transparent disc 40 which is fitted with a sight hole B, preferably with a blackened edge, and is made for instance of glass, and is mounted on a post 41 (see Figs. 7 and 6) which passes through a slit 42 in the top side of the box-shaped frame 16 and further on, through a block 44 disposed within the said frame as a slideable but not rotatable nut on a threaded spindle 43 parallel to the slit 42, and is fitted at the bottom with a roller 45 which is free to rotate in all directions and by means of which the said post rests on a cam body 46 which is journalled in the frame, the said cam body being coupled to one of the intermediate shafts (the shaft 37) in the frame, by way of which shaft the elevating apparatus of the gun drives the outer gimbal frame, in such a manner that the cam body is rotated simultaneously with the rotation of the gun about the horizontal axis. The ratio of gearing is of such a magnitude that the cam body is rotated through about 160° by the elevation of the gun from about 0° to 90°.

The slit 42 is situated in a vertical plane passing through the central point of the sight thread, and it forms a certain small angle (the angle of rifling deviation) with the vertical plane through the bore axis of the gun. By means of intermediate shafts 47 and 48 the spindle 43 is coupled to a shaft 49 journalled in the side wall of the frame and fitted with a crank handle 50, in such a manner that by the rotation of this handle the post 41 and thus also the eyepiece disc with sight hole B may be moved forward towards the objective (the centre of the thread) or rearward from the same, whereby the eyepiece may be adjusted according to the estimated target distance.

The adjustment is read on a scale disposed either along the edge of the slot 42 or along the edge of a circular disc 51 (Fig. 7) which by means of an intermediate shaft 52 and a worm gear is coupled to the crank shaft 49.

In a duplex sighting device like the one referred to here, only one of the devices is fitted with a crank handle 50 but, on the other hand, the two shafts 48 are coupled together through the transverse beam 17, by means of intermediate shafts 53, 54, 55 (see Figs. 5 and 7), in such a manner that a synchronous rotation of the two spindles 43 and, consequently, a synchronous displacement of the eyepieces will be secured.

The shape of the cam body 46 is such (see Fig. 2) that the same, in accordance with the ballistic data of the gun, will raise the eyepiece (the sight hole B) the higher, the greater a firing distance the latter is adjusted for (i. e., the nearer the eyepiece is moved forward to the objective), and again will decrease this elevation the more, the higher the gun is elevated.

As the pivot pin 30 of the inner gimbal frame normally is vertical, and the outer gimbal frame rotates about a horizontal axis synchronously with, but in the opposite direction of, the gun, the sight thread will only in the case of targets flying horizontally be able to be brought into, and maintained in a position parallel to the target course, solely by means of the elevating apparatus of the gun and the friction-coupling wheel 64' or, respectively, the elevating and side-turning apparatus of the gun. If the target "dives" (or ascends), the outer gimbal frame must therefore, independently of the elevation of the gun, be given a rotation corresponding to the diving angle concerned (d, Fig. 1). For this purpose the gun according to the invention is fitted with a special wheel—the diving wheel 56' (see Fig. 3)—which enters in such a manner in the connection between the elevating apparatus and the outer gimbal frame that the said wheel, by a suitable actuation, couples itself to the said frame and, at the same time, uncouples the gun and the elevating apparatus therefrom, in such a manner that a rotation of the wheel will subsequently effect a rotation of the said gimbal frame, without the elevation of the gun being at the same time altered correspondingly. The magnitude of the rotation is read on a scale the zero point of which indicates a wheel position corresponding to a horizontal target course.

The friction couplings 64 and 56 are disposed respectively between the lateral-rotation wheel 12 and the iner sight-thread frame 22 and between the elevational-rotation wheel 14 and the outer sight-thread frame 31 and are provided with special hand-operated wheels 64' and 56' respectively, each disposed on that part of its coupling that is frictionally moved when the corresponding lateral or elevational rotation wheel is rotated. It will thus be seen that if the special operating wheel 64' or 56' is taken hold of and rotated, only the sight-thread frame concerned and not the gun itself will be rotated, as the resistance of the gun against such rotations is so many times greater than the very small resistance of the sight-thread frame against the rotation impressed thereon that the power required for rotating the gun will be far from being able to be transmitted by the slight friction to which the friction coupling has to be adjusted, in order to be able to transmit the rotation of the lateral-or-elevational-rotation wheel to the inner or outer sight-thread frame. The result of a manipulation of the friction wheel 64' or 56' will consequently be that merely the corresponding sight-thread frame and not the gun itself will be rotated. Thus, for any position of the gun, it will be possible, by means of these wheels 64' and 56', to cause the sight-thread frame to move into any position in the space and, therefore, also to become parallel to the path of the target. When the sight-thread has been adjusted so as to become parallel to the target's path, the diving angle has automatically been taken into account.

Briefly told, the use of the duplex sighting device is as follows:

The gun commander adjusts (by a rotation of the knobs 25) the movable point marks of the objective thread, viz., the needles 29, to the estimated target velocity and (by rotation of the crank handle 50) the eyepiece disc 40 to the estimated target distance, while the diving wheel 56 is adjusted to the estimated diving angle.

With sighting-device parts adjusted in this manner, the "directors" must then, by means of the elevating and side-turning apparatuses adjust the gun into such a position that they have the target in the sighting field, after which the "directors," by means of the elevating apparatus and the friction-coupling wheel 64' cause the sight thread to become parallel to the target course, i. e., into such a position that the target, when viewed through the sight hole, appears to follow the thread (to remain in the field between the two threads). When this result is attained, and the sight thread is constantly maintained parallel to the target course, the "directors" must finally, by means of the elevating and side-turning apparatuses, enter the final sight—the sight across the one of the two lateral point marks on the thread (apparent points of intersection between the thread and the needles 29) to which the direction from the central point of the thread is opposite the direction of motion of the target—on to the target. When thus the sight is attained, the shot is fired. The firing is effected by the "elevation director." No mutual commanding between the "lateral director" and the "elevation director" takes place, as the "elevation director" can see from the position of his eyepiece, whether the "lateral director" has the correct sight (the sight of the "elevation director" being then in the hole of the glass disc).

A correction on the basis of the position of the tracer paths, relatively to the target, is performed by the fire-leader who operates the crank handle 50 and the adjusting screw 20. The correction is as a rule effected solely by rotating the crank handle 50, since any correction, as mentioned above, is effected as a correction of the estimated target distance. Only if the shots, in spite of such a correction, constantly remain too high or too low, the fire-leader will also use the adjusting screw 20, and by means thereof he may either lower or raise the rear end of the sighting-device frame 16, 17, 16.

If the sighting device (as a mono-apparatus) is to be used as a sighting device for several guns belonging to a battery, the device is mounted with its horizontal pins 18 (one pin on either side of the frame 16) in a fork adapted to rotate about a vertical axis, relatively to a stationary pivot. The frame 16 of the sighting device is then for this purpose fitted with a handle by means of which the "sighter," in order to effect the sighting, rotates the frame about the said horizontal pins (horizontal axis) and the vertical axis, one as well as the other one of these rotations being transmitted to the gimbal frames of the objective thread, in a similar manner as previously the adjustment of the gun about the horizontal and vertical axes.

The rotations of the sighting-device frame about the horizontal and vertical axes are transmitted to all the guns by a coupling system comprising an electric synchronizing device and a set of clocks with follower hands at each gun and the "directors" of the various guns as performers of the succession of hands in the individual clocks.

It is seen that the "directors" in this case are not also "sighters," but merely operate the elevating and side-turning apparatuses of the guns by means of which they take care to cause the follower hands of the clocks, which are synchronized with the said apparatus, to keep time with the master hands which are synchronous with the rotations of the sighting-device frame about the horizontal and vertical axes. In this case, the rotations of the sighting-device frame are consequently transmitted partly to the gun (the guns) and partly to the sight-thread gimbal frames, while in the former case the rotations of the gun about the horizontal and vertical axes caused the corresponding rotations of the sighting-device frame (or frames) as well as of the sight-thread gimbal frames.

Having thus described my invention, what I claim is:

1. In a sighting device for air-target guns, the combination of a main frame pivotally mounted for horizontal and vertical movement; gimbals supported on said frame; a sight-thread frame suspended in said gimbals; means for imparting to the latter frame horizontal and vertical angular motions about its gimbal axes; a sight-thread stretched in said latter frame and provided with a marked central point; a pair of point indicators mounted for sliding movement along said thread at opposite sides of said central point; means for simultaneously moving said indicators toward and from said central point; a disc supported in said main frame in a plane parallel with the sight-thread, said disc having a sight-opening therethrough; means for moving the disc in said main frame toward and away from the sight-thread; and means for moving said disc vertically for raising or lowering the disc.

2. In the combination set forth in claim 1, the sight-thread comprising two parallel threads spaced a short distance apart.

3. In the combination set forth in claim 1, the means for simultaneously moving the point indicators comprising a spindle mounted for rotation in parallel relation to said sight-thread, said spindle being oppositely threaded at opposite sides of said central point, nuts fitted to said oppositely threaded portions of the spindle, the point indicators being carried by said nuts, and means for maintaining the nuts against rotation.

4. The combination set forth in claim 1 in which the sight disc is supported on a post slidably mounted in a non-rotatable nut, and the means for moving the disc toward and away from the sight-thread comprises a threaded spindle in engagement with said nut and journaled in said main frame, a crank-handle shaft journaled in the side wall of said frame, and gearing between said crank-handle shaft and the spindle.

5. The combination set forth in claim 1, the sight-disc being supported on a post slidable toward and from the sight-thread, said post having at its lower end a freely rotatable roller, said means for moving said disc vertically comprising a cam member journaled in said main frame and in contact with said roller, and means for rotating the cam.

WERNER CHRISTIAN LASSEN HAUBROE.

REFERENCES CITED

The following references are of record in the file of this patent:

UNITED STATES PATENTS

| Number | Name | Date |
| --- | --- | --- |
| 659,606 | Formby | Oct. 9, 1900 |
| 1,264,169 | Feeney | Apr. 30, 1918 |
| 1,360,730 | Dawson et al. | Nov. 30, 1920 |
| 1,962,590 | Haubroe | June 12, 1940 |